United States Patent
Hayashi et al.

(10) Patent No.: US 6,786,840 B2
(45) Date of Patent: Sep. 7, 2004

(54) TWO-PIECE SOLID GOLF BALL

(75) Inventors: Junji Hayashi, Chichibu (JP); Yasumasa Shimizu, Chichibu (JP); Hiroshi Higuchi, Chichibu (JP); Rinya Takesue, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 10/720,468

(22) Filed: Nov. 25, 2003

(65) Prior Publication Data

US 2004/0106472 A1 Jun. 3, 2004

(30) Foreign Application Priority Data

Nov. 29, 2002 (JP) ........................................ 2002-349036

(51) Int. Cl.[7] .............................................. A63B 37/14
(52) U.S. Cl. ...................................................... 473/377
(58) Field of Search ................................ 473/377, 376, 473/378, 351, 371

(56) References Cited

U.S. PATENT DOCUMENTS

2003/0229183 A1 * 12/2003 Voorheis et al. ............. 525/232

FOREIGN PATENT DOCUMENTS

| JP | 07-268132 A | 10/1995 |
|---|---|---|
| JP | 08-276033 A | 10/1996 |
| JP | 08-294549 A | 11/1996 |
| JP | 11-035633 A | 2/1999 |
| JP | 2000-245870 A | 9/2000 |
| JP | 2002-293996 A | 10/2002 |

OTHER PUBLICATIONS

Mark R. Mason et al.; "Hydrolysis of Tri-*tert*-butylaluminum: The First Structural Characterization of Alkylalumoxanes [($R_2Al)_2O]_n$ and $(RAlO)_n$"; American Chemical Society; 115; 1993; pp. 4971–4984.
C. Jeff Harlan et al.; "Three–Coordinate Aluminum Is Not A Prerequisite for Catalytic Activity in the Zirconocene–Alumoxane Polymerization of Ethylene"; American Chemical Society; 117; 1995; pp. 6465–6474.
Report of Research & Development; Fine Chemical; vol. 23; No. 9, Jun. 1, 1994; pp. 5–15.

* cited by examiner

Primary Examiner—Raeann Gorden
(74) Attorney, Agent, or Firm—Sughrue Mion, PLLC

(57) ABSTRACT

Disclosed herein is a two piece solid golf ball consisting of a solid core and a cover, said solid core being formed from a rubber composition composed of a rubber base material of polybutadiene synthesized by using a catalyst of rare earth element, a small amount of organic peroxide, an unsaturated carboxylic acid and/or a metal salt thereof, an organic sulfur compound, and an inorganic filler, and said cover being formed mainly from a mixture of a block copolymer having amino groups at terminals and an ionomer resin. The two-piece solid golf ball is by far superior to conventional ones in flying performance, cover durability, scuff resistance, and soft shot feeling.

4 Claims, 2 Drawing Sheets

TWO-PIECE SOLID GOLF BALL

BACKGROUND OF THE INVENTION

The present invention relates to a golf ball characterized by good flying performance, high scuff resistance, and soft shot feeling.

A two-piece solid golf ball is made up of a core and a cover formed thereon. It is widely accepted by many golfers because of its long flying distance and good durability. On the other hand, it is inferior to a thread-wound golf ball in shot feeling due to stiffness and controllability due to high initial velocity.

There have been proposed several kinds of two-piece solid golf balls with a soft core which are designed to be competitive with thread-wound golf balls in shot feeling.

For example, JP-A 8-276033 discloses a technology to give a solid golf ball having a good shot feeling and a long flying distance. This object is achieved if the golf ball has a specific amount of compressive deformation such that the difference between P and Q is from 1.0 to 3.5 mm, where P denotes the compressive deformation which the core experiences as it receives a changing load from 10 kgf (initial) to 130 kgf (final) and Q denotes the compressive deformation which the ball experiences as it receives a changing load from 10 kgf (initial) to 130 kgf (final).

Also, JP-A 8-294549 discloses a technology to give a solid golf ball that exhibits a soft shot feeling, while keeping the characteristic properties of solid golf balls. This object is achieved if the solid core is soft with an amount of deformation no less than 3.5 mm under a load of 100 kgf and the cover is formed from a soft ionomer resin having a Shore D hardness of 50 to 63 and a 300% modulus of 15 to 35 MPa.

Furthermore, JP-A 2000-245870 discloses a technology to give a golf ball consisting of a core and a cover and having a large number of dimples formed in the ball surface. This golf ball is characterized by soft shot feeling, good spin performance, and good approach controllability owing to the adequate amount of deflection under a load of 100 kgf, the surface hardness of the core, the difference between the hardness of the core surface and the hardness of the core center, and the optimal R/S value, where R denotes the effective contact area which is produced when the face of the driver head comes into contact with the ball at a head speed of 50 m/s and S denotes the virtual contact area of the ball.

However, there is a demand for a golf ball which has a higher rebound resilience and further softer shot feeling so as to comply with golfers' wish for a longer flying distance.

SUMMARY OF THE INVENTION

The present invention was completed in view of the foregoing. It is an object of the present invention to provide a golf ball which exhibits good flying performance, good scuff resistance, and soft shot feeling.

To achieve the above-mentioned object, the present inventors carried out a series of researches, which led to the finding that a two-piece solid golf ball consisting of a solid core and a cover is by far superior to the conventional one in flying performance, scuff resistance, and soft shot feeling, if the core is specified in diameter, flexibility, and raw material (rubber composition), and the cover is specified in thickness, hardness, and raw material (resin composition), so that the golf ball as a whole has flexibility in a specific range.

According to the first aspect of the present invention, there is provided a two-piece solid golf ball made up of a solid core and a cover wherein the solid core is formed from a rubber composition composed of (A) 100 parts by weight of rubber base material containing 60 to 100% by weight of a polybutadiene which is synthesized with a catalyst of rare earth element and contains no less than 60% of cis-1,4-linkage, (B) 0.1 to 0.8 parts by weight of organic peroxide, (C) an unsaturated carboxylic acid and/or a metal salt thereof, (D) an organic sulfur compound, and (E) an inorganic filler and the solid core deforms by 3.0 to 5.5 mm under a load of 980 N (100 kgf) and has a diameter of 37 to 42 mm, and the cover is formed mainly from a mixture of (M) a block copolymer having amino groups at its terminals and (N) an ionomer resin, with the ratio of (M)/(N) being from 3/97 to 60/40 (by weight) and has a thickness of 0.5 to 2.5 mm and a Shore D hardness of 50 to 70, and that the two-piece solid golf ball made up of a solid core and a cover deforms by 3.0 to 5.0 mm under a load of 980 N (100 kgf).

According to the second aspect of the present invention, the polybutadiene may be a modified polybutadiene obtained by synthesis with an Nd-based catalyst as the catalyst of rare earth element and subsequent reaction with a terminal modifier.

According to the third aspect of the present invention, the rubber composition may be one which is composed of (A) 100 parts by weight of rubber base material containing no less than 60% of cis-1,4-linkage and also containing 60 to 100% by weight of polybutadiene synthesized by using a catalyst of rare earth element, (B) more than one kind of organic peroxide compound, (C) 10 to 60 parts by weight of an unsaturated carboxylic acid and/or a metal salt thereof, (D) 0.1 to 5 parts by weight of an organic sulfur compound, and (E) 5 to 80 parts by weight of an inorganic filler.

According to the fourth aspect of the present invention, the cover may have a large number of dimples in the surface thereof such that the dimple volume ratio (VR) may be 0.70 to 1.00% and the dimple surface area ratio (SR) may be 70 to 85%, with VR being defined as the ratio of the sum total of the volumes of individual dimples under the plane surrounded by the periphery of each dimple to the volume of a virtual sphere without dimples in the cover, and SR being defined as the ratio of the sum total of the areas surrounded by the periphery of individual dimples to the surface area of the virtual sphere.

According to the present invention, there is provided a two-piece solid golf ball which is by far superior to conventional ones in flying performance, cover durability, scuff resistance, and shot feeling.

DESCRIPTION OF THE PREFERRED EMBODIMENTS

Figure 1:
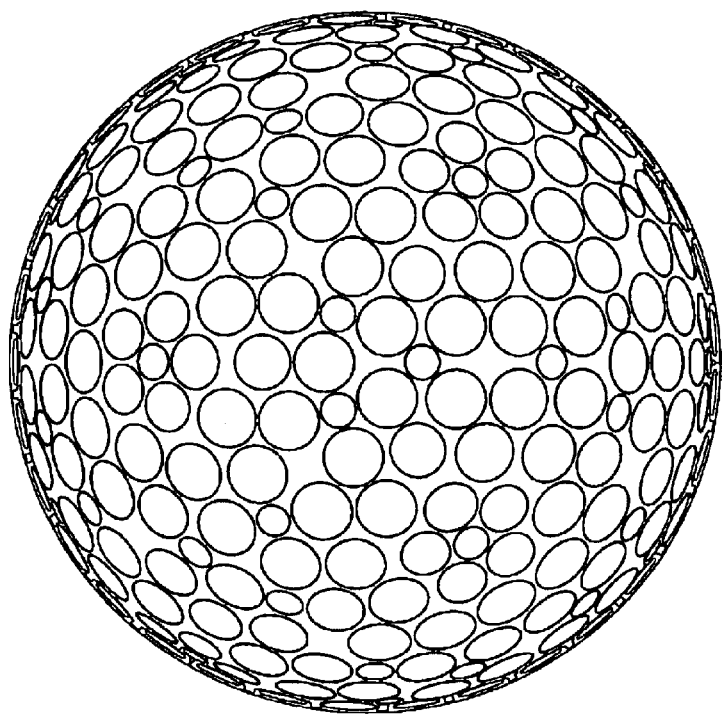
FIG. 1 is a schematic diagram illustrating the arrangement of the dimples (type A or type C) in Table 3.
Figure 1:
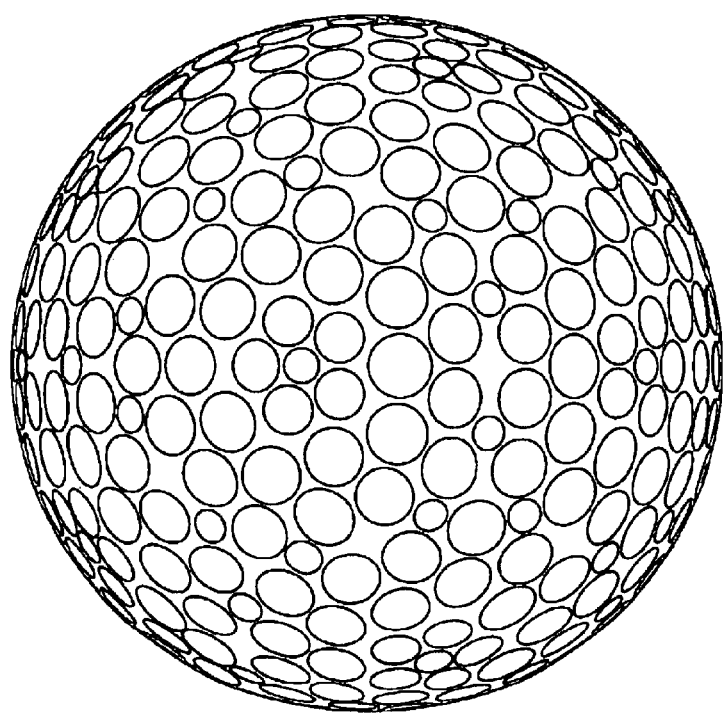

The invention will be described in more detail in the following.

According to the present invention, the solid core is formed from a rubber composition containing the following components.

(A) Rubber base material containing no less than 60% of cis-1,4-linkage and also containing 60 to 100% by weight of polybutadiene synthesized by using a catalyst of rare earth element;

(B) Organic peroxide compound;
(C) Unsaturated carboxylic acid and/or metal salt thereof;
(D) Organic sulfur compound; and
(E) Inorganic filler.

In component (A), which is a rubber base material containing no less than 60% of cis-1,4-linkage and also containing 60 to 100% by weight of polybutadiene synthesized by using a catalyst of rare earth element, the content of cis-1,4-linkage in the polybutadiene should be no less than 60%, preferably no less than 80%, more preferably no less than 90%, and most desirably no less than 95%. If the content of cis-1,4-linkage in the polybutadiene is less than 60%, the resulting golf ball will not have the desired rebound resilience.

According to the present invention, the polybutadiene mentioned above is one which is synthesized by using a catalyst of rare earth element. This catalyst is not specifically restricted, and any known one can be used. It includes compounds of rare earth elements (lanthanoid), organoaluminum compounds, alumoxane, and halogen-containing compounds, which may optionally be combined with a Lewis base.

The compounds of lanthanoid rare earth elements mentioned above include halides, carboxylates, alcoholates, thioalcoholates, and amides of metals having an atomic number from 57 to 71.

The organoaluminum compounds mentioned above include those compounds which are represented by $AlR^1R^2R^3$ (where $R^1$, $R^2$, and $R^3$, which may be the same or different, each denotes hydrogen or a $C_{1-8}$ hydrocarbon residue).

The alumoxane mentioned above includes those compounds represented by the formula (I) or (II) below. It may be an association product of alumoxane which is described in Fine Chemical, 23, (9), 5(1994), J. Am. Chem. Soc., 115, 4971 (1993), and J. Am. Chem. Soc., 117, 6465 (1995).

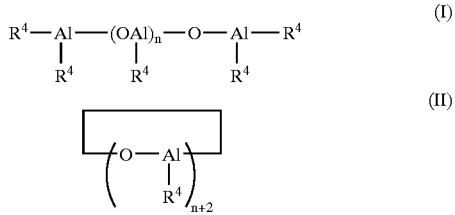

(where $R^4$ denotes a $C_{1-20}$ hydrocarbon group, and n denotes an integer of 2 or above.)

The halogen-containing compounds mentioned above include aluminum halides represented by $AlX_nR_{3-n}$ (where X denotes a halogen, R denotes a $C_{1-20}$ hydrocarbon group (such as alkyl group, aryl group, and aralkyl group), and n denotes 1, 1.5, 2, or 3) and strontium halides represented by $Me_3SrCl$, $Me_2SrCl_2$, $MeSrHCl_2$, and $MeSrCl_3$. Additional examples include such metal halides as silicon tetrachloride, tin tetrachloride, and titanium tetrachloride.

The Lewis base mentioned above is one which is used for complexing the compound of lanthanoid rare earth element. It includes acetylacetone and ketone alcohol.

According to the present invention, the compound of lanthanoid rare earth element may be a neodymium compound. The catalyst of this compound is desirable because of its polymerization activity which yields polybutadiene with a low content of 1,4-cis linkage and a high content of 1,2-vinyl linkage. Typical examples of the catalyst of rare earth element are described in JP-A 11-35633.

In polymerization of butadiene by a catalyst of rare earth element which is a compound of lanthanoid rare earth element, the molar ratio of butadiene to the catalyst should be 1,000 to 2,000,000, preferably 5,000 to 1,000,000, so that the resulting polymer has the cis content and the Mw/Mn ratio. In the case where the catalyst is composed of $AlR^1R^2R^3$ and a compound of lanthanoid rare earth element, the molar ratio of butadiene to the catalyst should be 1 to 1,000, preferably 3 to 500, and in the case where the catalyst is composed of halide compound and a compound of lanthanoid rare earth element, the molar ratio of butadiene to the catalyst should be 0.1 to 30, preferably 0.2 to 15. In the case where the catalyst is composed of a Lewis base and a compound of lanthanoid rare earth element, the molar ratio of butadiene to the catalyst should be 0 to 30, preferably 1 to 10. Polymerization may be achieved by solution polymerization with a solvent or bulk polymerization or gas phase polymerization without a solvent. The polymerization temperature is usually from −30 to 150° C., preferably from 10 to 100° C.

The thus obtained polybutadiene should have a Mooney viscosity ($ML_{1+4}$ (100° C.)) no lower than 40, preferably no lower than 50, more preferably no lower than 52, and most desirably no lower than 54. Its upper limit is usually no higher than 140, preferably no higher than 120, more preferably no higher than 100, and most desirably no higher than 80. With a Mooney viscosity outside the above-mentioned range, the polybutadiene will be poor in workability and rebound resilience.

Incidentally, the Mooney viscosity used in the present invention is an industrial viscosity index (conforming to JIS-K6300) measured by a Mooney viscometer, which is one kind of rotary plastometers. It is represented by the unit symbol of $ML_{1+4}(100°\ C.)$, in which M stands for Mooney viscosity, L stands for Large rotor (type L), 1+4 stands for 1 minute of duration of preliminary heating and 4 minutes of duration of rotation, and 100° C. denotes the heating temperature at which measurements are made.

According to the present invention, the polybutadiene obtained by using the catalyst of rare earth element may optionally be treated with a terminal modifier which reacts with the active terminals of the polymer.

The terminal modifier may be any known one selected from the following seven groups.

(1) Compounds having an alkoxysilyl group, such as alkoxysilane compounds having at least one epoxy group or isocyanate group in the molecule. Examples of the epoxy group-containing compounds include 3-glycidyloxypropyltrimethoxysilane, 3-glycidyloxypropyltriethoxysilane, (3-glycidyloxypropyl)methyldimethoxysilane, (3-glycidyloxypropyl)methyldiethoxylsilane, β-(3,4-epoxycyclohexyl)trimethoxysilane, β-(3,4-epoxycyclohexyl)triethoxysilane, β-(3,4-epoxycyclohexyl)methyldimethoxysilane, β-(3,4-epoxycyclohexyl)ethyldimethoxysilane, condensate of 3-glycidyloxypropyltrimethoxysilane, condensate of (3-glycidyloxypropyl)methyldiethoxylsilane, and condensate of (3-glycidyloxypropyl)methyldimethoxysilane. Examples of the isocyanate group-containing alkoxysilane compounds include 3-isocyantepropyltrimethoxysilane, 3-isocyanatepropyltriethoxysilane, (3-isocyanatepropyl)methyldimethoxysilane, (3-isocyanatepropyl)methyldiethoxysilane, condensate of 3-isocyanatepropyltrimethoxysilane, and condensate of (3-isocyanatepropyl)methyldimethoxysilane.

The reaction of the alkoxysilyl compound with active terminals may be promoted by the addition of a Lewis acid, so that the Lewis acid catalyses and accelerates the coupling reaction. The modified polymer thus obtained has good storage stability owing to improved cold flow properties. Examples of the Lewis acid include dialkyltin dialkyl maleate, dialkyltin dicarboxylate, and aluminum trialkoxide.
(2) Organometal halide compounds, metal halide compounds and organic metal compounds represented by the following formulas.

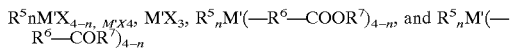

(where $R^5$ and $R^6$ (which are identical or different) each denote a $C_{1-20}$ hydrocarbon group, $R^7$ denotes a $C_{1-20}$ hydrocarbon group which may have a carbonyl group or ester group in the side chain, M' denotes tin, silicon, germanium, or phosphorus, X denotes halogen, and n is an integer of 0 to 3.)
(3) Heterocumulene compounds having the Y=C=Z linkage in the molecule (where Y denotes carbon, oxygen, nitrogen, or sulfur, and Z denotes oxygen, nitrogen, or sulfur).
(4) 3-membered heterocyclic compounds having the following linkage in the molecule.

(where Y denotes oxygen, nitrogen, or sulfur.)
(5) Halogenated isocyano compounds.
(6) Carboxylic acids, acid halides, ester compounds, carbonate ester compounds, and acid anhydrides represented by the following formulas.

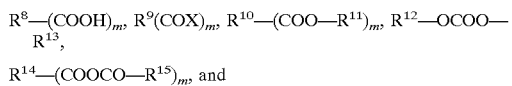

$R^{14}$—$(COOCO$—$R^{15})_m$, and

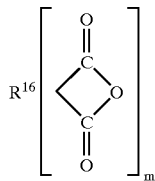

(where $R^8$ to $R^{16}$ which may be identical or different, each denotes a $C_{1-50}$ hydrocarbon group, X denotes halogen, and m is an integer of 1 to 5.)
(7) Metal salts of carboxylic acid represented by the following formulas.

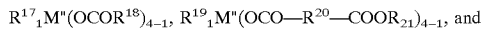

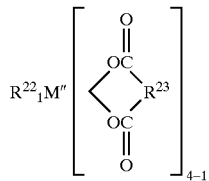

(where $R^{17}$ to $R^{23}$ which may be identical or different, each denotes a $C_{1-20}$ hydrocarbon group, M" denotes tin, silicon, or germanium, and l is an integer of 0 to 3.)
The examples and reactions of the terminal modifiers mentioned above are described in JP-A 11-35633, 7-268132, and 2002-293996.

Incidentally, of the above-mentioned catalysts, those of rare earth element, particularly Nd are preferable.

According to the present invention, the above-mentioned polybutadiene should have a molecular weight distribution Mw/Mn (where Mw denotes the weight-average molecular weight and Mn denotes the number-average molecular weight) no less than 2.0, preferably no less than 2.2, more preferably no less than 2.4, and most desirably no less than 2.6. Its upper limit should be no less than 8.0, preferably no less than 7.5, more preferably no less than 4.0, and most desirably no less than 3.4. With an excessively small Mw/Mn, the polybutadiene will be poor in workability. Conversely, with an excessively large Mw/Mn, the polybutadiene will be poor in rebound resilience.

According to the present invention, component (A) mentioned above is a rubber base material composed mainly of the above-mentioned polybutadiene. The content of the polybutadiene in the rubber base material should be no less than 60% by weight, preferably no less than 70% by weight, more preferably no less than 80% by weight, and most desirably no less than 85% by weight. The polybutadiene in the rubber base material may account for 100% by weight, 95% by weight or less, or 90% by weight or less. If the content of polybutadiene is less than 60% by weight, the resulting rubber is poor in rebound resilience.

Incidentally, component (A) mentioned above contains, in addition to the polybutadiene specified above, any polybutadiene other than the polybutadiene specified above, synthesized by using a catalyst of Group VIII metal, other diene rubbers such as styrene-butadiene rubber, natural rubber, isoprene rubber, and ethylene-propylene-diene rubber.

The second polybutadiene (as an additional rubber component) should preferably be one which is synthesized by using a catalyst of Group VIII metal. It should have a Mooney viscosity ($ML_{1+4}$(100° C.)) lower than 50 and a solution viscosity η no lower than 200 mPa·s and no higher than 400 mPa·s at 25° C. (5% by weight in toluene), so that the resulting rubber has high rebound resilience and good workability.

The catalyst of Group VIII metal mentioned above includes, for example, nickel catalysts and cobalt catalysts enumerated in the following.

Nickel catalysts: nickel-diatomaceous earth (one-component type), Raney nickel/titanium tetrachloride (two-component type), and nickel compound/organometallic compound/boron trifloride etherate (three-component type). Incidentally, the nickel compound includes reduced nickel with a carrier, Raney nickel, nickel oxide, nickel carboxylate, and organic nickel complex salt. The organometallic compound includes trialkylaluminum, such as triethylaluminum, tri-n-propyl-aluminum, triisobutylaluminum, and tri-n-hexylaluminum, alkyllithium, such as n-butyllithium, sec-butyllithium, tert-butyllithium, and 1,4-dilithiumbutane, dialkylzinc, such as diethylzinc and dibutylzinc.

Cobalt catalysts: Raney cobalt, cobalt chloride, cobalt bromide, cobalt iodide, cobalt oxide, cobalt sulfate, cobalt carbonate, cobalt phosphate, cobalt phthalate, cobalt carbonyl, cobalt acetylacetonate, cobalt diethyldithiocarbamate, cobalt anilinium nitrite, cobalt dinitrocyclochloride, and so forth. They should preferably be used in combination with a dialkylaluminum monochloride such as diethylaluminum monochloride and diisobutylaluminum monochloride, a trialkylaluminum such as trimethylaluminum, tri-n-propylaluminum, triisobutylaluminum, and tri-n-hexylaluminum, an aluminum alkylsesquichloride such as ethylaluminum sesquichloride, or aluminum chloride.

The catalyst of Group VIII metal mentioned above, particularly nickel-based catalyst or cobalt-based catalyst, is used for polymerization in such a way that it is continuously fed, together with butadiene monomer, into the reactor. Polymerization should be carried out at a reaction temperature of 5 to 60° C. and a reaction pressure ranging from about 1 to 70 atm, so that the resulting rubber has the Mooney viscosity specified above.

The second polybutadiene mentioned above should have a Mooney viscosity lower than 50, preferably lower than 48, and more preferably lower than 45. The lower limit of Mooney viscosity should be no lower than 10, preferably no lower than 20, more preferably no lower than 25, and most desirably no lower than 30.

Also, the second butadiene should have a solution viscosity η (5% by weight in toluene at 25° C.) no lower than 200 mPa·s, preferably no lower than 210 mPa·s, more preferably no lower than 230 mPa·s, and most desirably no lower than 250 mPa·s, and no higher than 400 mPa·s, preferably no higher than 370 mPa·s, more preferably no higher than 340 mPa·s, and most desirably no higher than 300 mPa·s.

The solution viscosity η (5% by weight in toluene at 25° C.) is a viscosity of a solution containing a polybutadiene sample (2.28 g) dissolved in toluene (50 mL), which is measured at 25° C. by using a specific viscometer which has been calibrated with the standard solution (JIS-Z8809).

The amount of the second polybutadiene in the rubber base material should be no less than 0%, preferably no less than 5%, and more preferably no less than 10%, and no more than 40%, preferably no more than 30%, more preferably no more than 20%, and most desirably no more than 15%.

The organic peroxide as component (B) in the present invention should preferably be a combination of two or more kinds. The one having the shortest half-life (at 155° C.) is referred to as component (a), and the one having the longest half-life (at 155° C.) is referred to as component (b). If component (a) has a half-life of $a_t$ and component (b) has a half-life of $b_t$, then the ratio of $b_t/a_t$ should be no less than 7, preferably no less than 8, more preferably no less than 9, and most desirably no less than 10, and no more than 20, preferably no more than 18, and more preferably no more than 16. Even though more than one kind of organic peroxide is used, the resulting rubber might be poor in rebound resilience, compression, and durability if they do not meet the above-mentioned requirement.

The half-life $a_t$ (at 155° C.) of component (a) should be no less than 5 seconds, preferably no less than 10 seconds, and more preferably no less than 15 seconds, and no more than 120 seconds, preferably no more than 90 seconds, and more preferably no more than 60 seconds. The half-life $b_t$ (at 155° C.) of component (b) should be no less than 300 seconds, preferably no less than 360 seconds, and more preferably no less than 420 seconds, and no more than 800 seconds, preferably no more than 700 seconds, and more preferably no more than 600 seconds.

The organic peroxide mentioned above includes, for example, dicumyl peroxide, 1,1'-bis(t-butylperoxy)-3,5,5-trimethylcyclohexane, and α,α'-bis(t-butylperoxy)diisopropylbenzene. These organic peroxides are commercially available under the trade name of "Percumyl D" (from NOF CORPORATION), "Perhexa 3M" (from NOF CORPORATION), and "Luperco 231XL" (from Atochem). A preferred example of component (a) is 1,1'-bis(t-butylperoxy)-3,5,5-trimethylcyclohexane, and a preferred example of component (b) is dicumyl peroxide.

The total amount of the organic peroxides including components (a) and (b), based on 100 parts by weight of component (A), should be no less than 0.1 part by weight, preferably no less than 0.2 part by weight, more preferably no less than 0.3 part by weight, and most desirably no less than 0.4 part by weight. Its upper limit should be no more than 0.8 part by weight, preferably no more than 0.7 part by weight, more preferably no more than 0.6 part by weight, and most desirably no more than 0.5 part by weight. With an excessively small amount, the resulting rubber composition takes a long time for crosslinking, which leads to low productivity, and has large decompression. With an excessively large amount, the resulting rubber is poor in rebound resilience and durability.

According to the present invention, the core should be formed from polybutadiene synthesized by using a catalyst of rare earth element, particularly an Nd-based catalyst, and the addition amount of the organic peroxides should be set in the range above-specified, so that the resulting golf ball has high rebound resilience. High rebound resilience makes the solid core or the golf ball as a whole soft, which leads to increased flying distance and soft shot feeling owing to low spin and high initial velocity at the time of full shot with a driver.

The amount of component (a), based on 100 parts by weight of component (A), should be no less than 0.05 part by weight, preferably no less than 0.08 part by weight, and more preferably no less than 0.1 part by weight, and no more than 0.5 part by weight, preferably no more than 0.4 part by weight, and more preferably no more than 0.3 part by weight. The amount of component (b) should be no less than 0.05 part by weight, preferably no less than 0.15 part by weight, and more preferably no less than 0.2 part by weight, and no more than 0.7 part by weight, preferably no more than 0.6 part by weight, and more preferably no more than 0.5 part by weight.

The unsaturated carboxylic acid and/or metal salt thereof as component (C) include acrylic acid, methacrylic acid, maleic acid, and fumaric acid as the unsaturated carboxylic acid, especially acrylic acid and methacrylic acid are preferable; and also include zinc salt and magnesium salt as the metal salt of the unsaturated carboxylic acid, especially zinc acrylate is preferable.

The amount of component (C), based on 100 parts by weight of component (A), should be no less than 10 parts by weight, preferably no less than 15 parts by weight, and more preferably no less than 20 parts by weight. Its upper limit should be no more than 60 parts by weight, preferably no more than 50 parts by weight, more preferably no more than 45 parts by weight, and most desirably no more than 40 parts by weight. With an amount outside the above-specified range, the resulting golf ball will be poor in rebound resilience and shot feeling.

According to the present invention, the organic sulfur compound as component (D) includes thiophenol, thiophthol, halogenated thiophenol, and metal salts thereof. Their typical examples include pentathiophenol, pentafluorothiophenol, pentabromothiophenol, and parachlorothiophenol, and zinc salts thereof; diphenylpolysulfide, dibenzylpolysulfide, dibenzoylpolysulfide, dibenzothiazoylpolysulfide, dithiobenzoylpolysulfide (polysulfide having 2 to 4 sulfur atoms), alkylphenyldisulfide, sulfur compounds having a furan ring, and sulfur compounds having a thiophen ring. Of these examples, zinc salt of pentachlorothiophenol and diphenyldisulfide are preferable.

The amount of component (D), based on 100 parts by weight of component (A), should be no less than 0.1 part by weight, preferably no less than 0.2 part by weight, more preferably no less than 0.4 part by weight, and most desirably no less than 0.7 part by weight, and no more than 5 parts by weight, preferably no more than 4 parts by weight, more preferably no more than 3 parts by weight, and most desirably no more than 2 parts by weight, particularly no more than 1.5 parts by weight. With an excessively small amount, component (D) does not produce the effect of improving rebound resilience. With an excessively large amount, the resulting rubber is too soft to produce the desired rebound resilience.

According to the present invention, the inorganic filler as component (E) includes, for example, zinc oxide, barium sulfate, and calcium carbonate. The amount of component (E), based on 100 parts by weight of component (A), should be no less than 5 parts by weight, preferably no less than 7 parts by weight, more preferably no less than 10 parts by weight, and most desirably no less than 13 parts by weight. Its upper limit should be no more than 80 parts by weight, preferably no more than 65 parts by weight, more preferably no more than 50 parts by weight, and most desirably no more than 40 parts by weight. With an excessively small or large amount, the resulting golf ball will not have the specified weight and desired rebound resilience.

The rubber composition containing components (A) to (E) mentioned above may optionally be incorporated with an antioxidant. The amount of antioxidant, based on 100 parts by weight of component (A), should be no less than 0.05 part by weight, preferably no less than 0.1 part by weight, and more preferably no less than 0.2 part by weight, and no more than 3 parts by weight, preferably no more than 2 parts by weight, more preferably no more than 1 part by weight, and most desirably no more than 0.5 part by weight.

The antioxidant may be commercially available under the trade name of "NOCRAC NS-6" and "NOCRAC NS-30" (both from OUCHISHINKO CHEMICAL INDUSTRIAL Co., LTD.) and "Yoshinox 425" (from Yoshitomi Pharmaceutical Industrial Co., Ltd.).

According to the present invention, the solid core mentioned above is molded from the rubber composition containing components (A) to (E) mentioned above. Molding should preferably be achieved by vulcanizing and curing the rubber composition. Vulcanization may take 10 to 40 minutes at 100 to 200° C.

The solid core molded as mentioned above may have an adequately controlled distribution of local hardness. In other words, the solid core may be uniform or varied in local hardness from the center to the surface.

The solid core should have a diameter no less than 37 mm, preferably no less than 38 mm, and more preferably no less than 38.5 mm. Its upper limit should be no more than 42 mm, preferably no more than 41 mm, and more preferably no more than 40 mm. A solid core with a diameter smaller than 37 mm will adversely affects the shot feeling and rebound resilience. On the other hand, a solid core with a diameter larger than 42 mm makes the resulting golf ball poor in cracking resistance.

The solid core mentioned above should have an amount of deflection under a load of 980 N (100 kgf) which is no less than 3.0 mm, preferably no less than 3.3 mm, more preferably no less than 3.5 mm, and most desirably no less than 3.8 mm. Its upper limit should be no more than 5.5 mm, preferably no more than 5.2 mm, more preferably no more than 5.0 mm, and most desirably no more than 4.8 mm. With an amount of deflection less than 3.0 mm, the resulting golf ball is poor in shot feeling and is also poor in flying performance owing to too much spin at the time of long shot because the ball undergoes large deformation by the driver.

On the other hand, with an amount of deflection more than 5.5 mm, the resulting golf ball is poor in shot feeling and rebound resilience and hence poor in flying performance and is subject to cracking by repeated shots.

The solid core mentioned above should have a specific gravity ($g/cm^3$) no less than 0.9, preferably no less than 1.0, and more preferably no less than 1.1. Its upper limit should be no more than 1.4, preferably no more than 1.3, and more preferably no more than 1.2.

According to the present invention, the cover is formed mainly from a mixture of (M) a block copolymer having amino groups at terminals and (N) an ionomer resin, with the ratio of (M)/(N) being from 3/97 to 60/40 (by weight). In the following description the cover according to the present invention may also referred simply to a "cover material".

According to the present invention, the block copolymer having terminal amino groups as component (M) should preferably be a block copolymer having olefin crystalline blocks, with its terminals modified by amino groups.

The above-mentioned block copolymer having olefin crystalline blocks should preferably be one which consists of hard segments and soft segments, the former being olefin crystalline blocks (Co) or olefin crystalline blocks (Co) and styrene crystalline blocks (Cs) in combination, and the latter being blocks of comparatively random copolymer structure (EB) composed of ethylene and butylenes. The block copolymer should preferably have any of molecular structures represented by Co-EB, Co-EB-Co, and Cs-EB-Co, with the hard segment being either at one terminal or at both terminals. Examples of the olefin crystalline block include crystalline polyethylene block and crystalline polypropylene block, with the former being preferable.

The above-mentioned block copolymer having olefin crystalline blocks may be obtained by hydrogenating polybutadiene or styrene-butadiene copolymer.

The polybutadiene and styrene-butadiene copolymer used for hydrogenation should preferably be one which has a block containing more than 95% by weight of 1,4-linkage, with the amount of 1,4-linkage in butadiene being no less than 50% by weight, preferably no less than 80% by weight.

The block copolymer having the Co-EB-Co structure should preferably be one in which both terminals of the molecule is a 1,4-polymer rich in 1,4-linkage and the intermediate part is a hydrogenated product of polybutadiene having both 1,4-linkage and 1,2-linkage.

In the case where the block copolymer having olefin crystalline blocks has its terminals modified with amino groups, it is desirable that the styrene block terminals be modified with amino groups.

In the hydrogenated product of polybutadiene and styrene-butadiene copolymer, the amount of hydrogen added should preferably be 60 to 100%, preferably 90 to 100%, (in terms of the ratio of conversion of double bonds into saturated bonds in the polybutadiene or styrene-butadiene copolymer). Insufficient hydrogenation might cause deterioration such as gelation during blending with an ionomer resin, and hence the cover might be poor in weather resistance and impact resistance.

The above-mentioned block copolymer having olefin crystalline blocks should preferably contain the hard segment in an amount of 10 to 50% by weight. With an excessively large amount of hard segment, the block copolymer might lack flexibility, which prevents achieving the object of the present invention. With an excessively small amount of hard segment, the block copolymer might cause a problem with molding the blended product.

In addition, the block copolymer having olefin crystalline blocks should preferably have a number-average molecular weight of 30,000 to 800,000.

The above-mentioned block copolymer having olefin crystalline blocks should preferably have a melt index of 0.5 to 15 g/10 min, preferably 1 to 7 g/10 min, at 230° C. With a melt index outside this range, the block copolymer might cause a problem with weld line, sink, and short shot at the time of injection molding.

The ionomer resin as component (N) in the present invention may be any one which has conventionally been used as the cover material for the golf ball. It should preferably be one which contains components (N-1) and (N-2). Component (N-1) is a binary random copolymer of olefin and unsaturated carboxylic acid and/or a product obtained by neutralizing with metal ions a binary random copolymer of olefin and unsaturated carboxylic acid. Component (N-2) is a ternary random copolymer of olefin, unsaturated carboxylic acid, and unsaturated carboxylic ester and/or a product obtained by neutralizing with metal ions a ternary random copolymer of olefin, unsaturated carboxylic acid, and unsaturated carboxylic ester.

The olefin in component (N-1) or component (N-2) should preferably be α-olefin. Examples of α-olefin include ethylene, propylene, and 1-butene. Of these examples, ethylene is particularly desirable. These olefins may be used in combination with one another.

The unsaturated carboxylic acid in component (N-1) or component (N-2) should preferably be a $C_{3-8}$ α,β-unsaturated carboxylic acid. Examples of $C_{3-8}$ α,β-unsaturated carboxylic acids include acrylic acid, methacrylic acid, ethacrylic acid, itaconic acid, maleic acid, and fumaric acid. Of these examples, acrylic acid and methacrylic acid are preferable. These unsaturated carboxyllc acids may be used in combination with one another.

The unsaturated carboxylic ester in component (N-2) should preferably be a lower alkyl ester of the above-mentioned unsaturated carboxylic acid. It includes, for example, those products obtained by reacting the above-mentioned unsaturated carboxylic acid with a lower alcohol such as methanol, ethanol, propanol, n-butanol, and isobutanol. Of these examples, acrylate ester and methacrylate ester are desirable.

Typical examples of the unsaturated carboxylic ester in component (N-2) include methyl methacrylate, ethyl methacrylate, propyl methacrylate, butyl methacrylate, methyl acrylate, ethyl acrylate, propyl acrylate, and butyl acrylate. Of these examples, butyl acrylate (n-butyl acrylate or i-butyl acrylate) is desirable. These unsaturated carboxylic esters may be used in combination with one another.

The above-mentioned olefin-unsaturated carboxylic acid copolymer or olefin-unsaturated carboxylic acid-unsaturated carboxylic ester may further be copolymerized with any monomer within the scope of the present invention.

The amount of unsaturated carboxylic acid in these copolymers should preferably be 5 to 20% by weight for component (N-1) and 1 to 10% by weight for component (N-2). With an excessively small amount of unsaturated carboxylic acid, the resulting golf ball will be poor in flying performance due to low stiffness and rebound resilience. With an excessively large amount of unsaturated carboxylic acid, the resulting golf ball will be poor in flexibility.

The content of unsaturated carboxylic ester in component (N-2) should preferably be 12 to 45% by weight. With an excessively small content, the unsaturated carboxylic ester will not produce its effect. With an excessively large content, the unsaturated carboxylic ester will not contribute to rebound resilience.

In the case where components (N-1) and (N-2) are used in combination, their ratio (N-1)/(N-2) should be from 100/0 to 25/75, preferably from 100/0 to 50/50 (by weight). An excessively large amount of component (N-2) will have an adverse effect on rebound resilience.

According to the present invention, the ionomer resin as component (N) should preferably be one which is obtained by neutralizing the above-mentioned copolymer with at least one kind of mono- to trivalent metal ions. Such metal ions include sodium ions, potassium ions, lithium ions, magnesium ions, calcium ions, zinc ions, aluminum ions, ferrous ions, and ferric ions.

Introduction of these metal ions may be accomplished by reaction between the above-mentioned copolymer and the above-mentioned mono- to trivalent metals in the form of methoxide, ethoxide, carbonate, nitrate, formate, acetate, or oxide.

The extent to which the carboxylic acid contained in the above-mentioned copolymer is neutralized should be no less than 10 mol %, particularly no less than 30 mol %, and no more than 100 mol %, particularly no more than 90 mol %. Insufficient neutralization will lead to low rebound resilience.

For further improvement in rebound resilience, it is desirable to use an ionomer of monovalent metal and an ionomer of divalent metal in combination. In this case, the ratio of the former to the latter should be from 20/80 to 80/20 (by weight).

It is known that the layer formed mainly from a blend of ionomer resins each containing different species of mono- to trivalent metal ions has good rebound resilience as well as durability. Blending in this way should preferably be employed in the present invention.

The ionomer resin as component (N) used in the present invention may be any commercial one, such as "Surlyn" from DuPont in the US and "Himilan" from Du pont-Mitsui Polychemicals Co., ltd.

According to the present invention, the amino group-terminated block copolymer as component (M) and the ionomer resin as component (N) should be mixed in such a ratio that the former accounts for 3 to 60 parts by weight, preferably 10 to 60 parts by weight, more preferably 20 to 45 parts by weight, and the latter accounts for 97 to 40 parts by weight, preferably 90 to 40 parts by weight, more preferably 80 to 55 parts by weight, with the total amount being 100 parts by weight. If the amount of component (M) is excessively small, the ionomer resin is not made sufficiently soft and hence the resulting golf ball is poor in shot feeling and controllability. If the amount of component (M) is excessively large, the resulting golf ball is poor in cut resistance.

According to the present invention, the cover material may optionally be incorporated with additives such as pigment, dispersing agent, antioxidant, UV light absorber, light stabilizer and inorganic filler within the scope of the present invention.

Examples of the additives include zinc oxide, barium sulfate, titanium dioxide, magnesium oxide, magnesium hydroxide, magnesium carbonate, sodium hydroxide, sodium carbonate, calcium oxide, calcium hydroxide, lithium hydroxide, lithium carbonate, and magnesium stearate.

The amount of the additives, based on 100 parts by weight of the mixture of components (M) and (N) mentioned above, should be 0.1 to 50 parts by weight, preferably 0.5 to 30 parts by weight, and more preferably 1 to 6 parts by weight. Additives in an excessively large amount will reduce durability. Additives in an excessively small amount do not produce their effect.

According to the present invention, the cover material should have a hardness (Shore D) no lower than 50, preferably no lower than 53, and no higher than 70, preferably no higher than 64. With an excessively low hardness, the cover material is poor in rebound resilience. With an excessively high hardness, the cover material is poor in shot feeling and controllability. The Shore hardness (D) is measured by using a durometer type D, according to ASTM D2240.

The above-mentioned cover material should have a density of 0.85 to 1.2 g/cm$^3$, preferably 0.9 to 1.1 g/cm$^3$, more preferably 0.92 to 1.0 g/cm$^3$.

The cover material in the present invention is not specifically restricted in its manufacturing method. It may be obtained by mixing the above-mentioned components at 150 to 250° C. in an internal mixer such as twin-screw extruder, Banbury mixer, and kneader.

In the case where the cover material is incorporated with additives in addition to components (M) and (N) mentioned above, the blending method is not specifically restricted. It is possible to heat mix them all at once, or it is also possible to heat mix components (M) and (N) in advance and heat mix additives later.

The cover material mentioned above is by far superior in rebound resilience.

The combination of the soft core and cover mentioned above results in a golf ball which is soft and yet is capable of long fly. This golf ball gives a soft shot feeling and has good scuff resistance because it is soft enough to provide a large area for contact with the club, thereby dispersing impact, when it is hit.

The two-piece golf ball according to the present invention consists of the core mentioned above and the cover formed from the cover material mentioned above.

The cover may be formed by any known method without specific restrictions. It is usually formed by injection molding which causes a melt of the cover material to flow into a cavity in which the previously prepared cored is placed. Production in this manner ensures good fluidity and moldability and yields a golf ball having high rebound resilience.

According to an alternative method, the golf ball may be formed in two stages. First, the cover material is made into a pair of semispherical cups and then the cups are joined together, with the core enclosed therein, under pressure at 120 to 170° C. for 1 to 5 minutes.

According to the present invention, the cover material should have a properly controlled melt flow rate so that it provides good fluidity for injection molding and improved moldability. The melt flow rate (MFR), which is measured at 190° C. under a load of 21.18 N (2.16 kg) according to JIS-K6760, should be no lower than 0.5 dg/min, preferably no lower than 1 dg/min, more preferably no lower than 1.5 dg/min, and most desirably no lower than 2 dg/min. Its upper limit should be no higher than 20 dg/min, preferably no higher than 10 dg/min, more preferably no higher than 5 dg/min, and most desirably no higher than 3 dg/min. With an excessively high or low melt flow rate, the cover material will be extremely poor in processability.

The cover formed from the cover material should have a thickness no less than 0.5 mm, preferably no less than 0.9 mm, and more preferably no less than 1.1 mm. Its upper limit should be no more than 2.5 mm and preferably no more than 2.0 mm. With an excessively large or small thickness, the cover is poor in rebound resilience or poor in durability, respectively.

According to the present invention, the cover of the two-piece golf ball permits a large number of dimples to be formed therein and accepts a variety of surface treatments such as priming, stamping, and coating. The dimples should be arranged in such a way that there is not any single great circle which does not cross the dimples. Failing to meet this requirement brings about variation in flying performance.

As the dimples described above, it is preferable that the type and number of the dimples are adequately controlled. By the synergistic effect produced by forming the arrangement, type, and number of the dimples as described above, the resulting golf ball exhibits good flying performance with a stable trajectory.

The type of the dimples varies depending on the diameter and/or depth of the dimples. Two or more types, preferably three or more types, should be used. No more than eight types, particularly no more than six types, should be used.

The total number of dimples should be no less than 300, and preferably no less than 320. Its upper limit should be no more than 480, and preferably no more than 455. With an excessively large or small number, the dimples do not provide an adequate lift necessary for good flying performance.

The above-mentioned dimples should have an adequate dimple volume ratio (VR) and an adequate dimple surface area ratio (SR). The VR and SR produce a synergistic effect of improving the trajectory, lift, and flying distance.

The dimple volume ratio (VR) in % is defined as the ratio of the volume of a virtual golf ball without dimples to the volume of dimples on an actual golf ball. The two-piece golf ball according to the present invention should have a VR value (%) of no less than 0.70, preferably no less than 0.75, and no more than 1.00, preferably no more than 0.82, more preferably no more than 0.79.

The dimple surface area ratio (SR) in % is defined as the ratio of the total area of dimples to the surface area of a virtual sphere. The SR value (%) should be no less than 70, preferably no less than 72, and no more than 85, more preferably no more than 83.

With VR values and SR values outside the range specified above, the resulting golf ball will be poor in flying distance due to incorrect trajectories.

When combined with the solid core and cover mentioned above, the adequately designed dimples ensure a long flying distance with a improved trajectory, while preventing dropping.

The dimple volume ratio (VR) and the dimple surface area ratio (SR) are calculated from measurements of a finished golf ball. For example, in case of the ball being processed final coating such as painting and stamping on the surface thereof following to the forming of the cover described above, the calculation is implemented based on the shape of the dimples of the finished golf ball which have undergone all processes.

The two-piece golf ball according to the present invention may have a diameter no less than 42.67 mm, and also have a weight no less than 45.93 g, preferably in the range of 45.0 to 45.93 g, which conform with the Rules of Golf.

The two-piece golf ball according to the present invention consists of the core and cover as specified above and has a large number dimples as specified above. The ball as a whole should have an amount of defection under a load of 980 N (100 kgf) which is no less than 3.0 mm, preferably no less than 3.2 mm, more preferably no less than 3.4 mm, and most desirably no less than 3.6 mm. Its upper limit should be no more than 5.0 mm, preferably no more than 4.8 mm, more preferably no more than 4.6 mm, and most desirably no more than 4.4 mm. With an amount of deflection less than 3.0 mm, the resulting golf ball is poor in shot feeling and is also poor in flying performance owing to spin at the time of long shot because the ball undergoes large deformation by the driver. On the other hand, with an amount of deflection more than 5.0 mm, the resulting golf ball is poor in shot feeling and rebound resilience (and hence flying performance) and is subject to cracking by repeated shots.

EXAMPLES

The present invention will be described in more detail with reference to the following Examples and Comparative Examples, which are not intended to restrict the scope thereof.

Examples 1 to 3 and Comparative Examples 1 to 3

In each example, a solid core was made from the rubber composition shown in Table 1 by vulcanization at 155° C. for 17 minutes.

Figure 2:
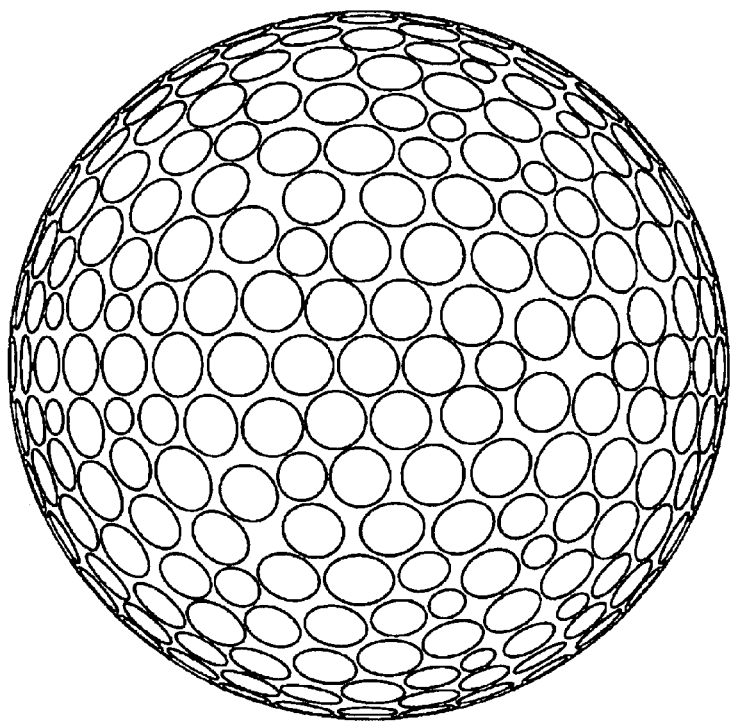
FIG. 2 is a schematic diagram illustrating the arrangement of the dimples (type B) in Table 3.
Figure 2:
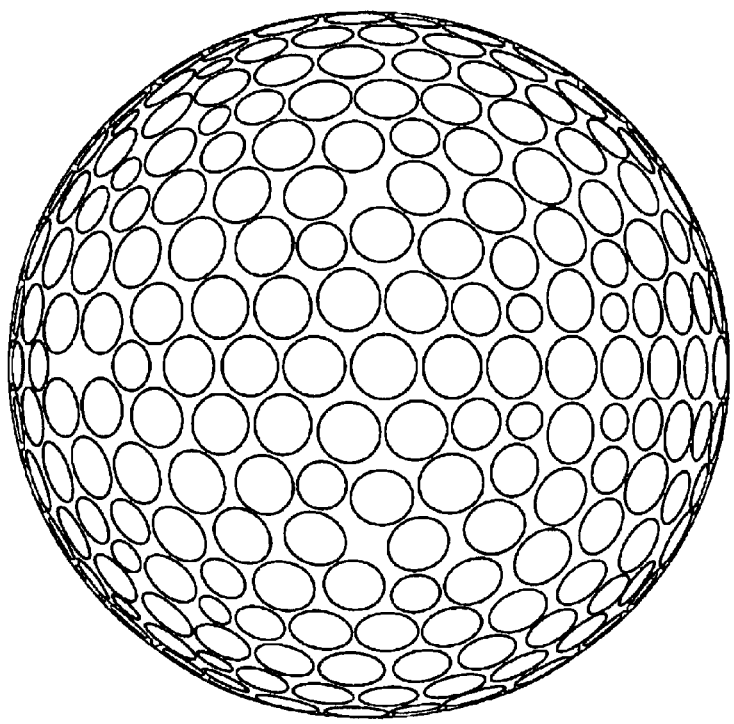

A cover material of the composition shown in Table 2 was prepared by mixing at 200° C. in a twin-screw extruder, followed by pelletizing. The thus obtained cover material was injection-molded into a cavity in which the above-mentioned solid core had been placed. In this way, a two-piece golf ball was produced. The types of dimples on the cover are shown in Table 3. The arrangement of dimples (types A to C) is illustrated in FIGS. 1 and 2.

The physical properties of the resulting golf balls are shown in Table 4.

TABLE 1

| Components (parts by weight) | | Example | | | Comparative Example | | |
|---|---|---|---|---|---|---|---|
| | | 1 | 2 | 3 | 1 | 2 | 3 |
| Rubber composition | HCBN-13 | 100 | 100 | 100 | | | |
| | BR01 | | | | 50 | 50 | 50 |
| | BR11 | | | | 50 | 50 | 50 |
| Organic peroxide | Perhexa 3M-40 | 0.3 | 0.3 | 0.3 | 0.6 | 0.6 | 0.6 |
| | Percumyl D | 0.3 | 0.3 | 0.3 | 0.6 | 0.6 | 0.6 |
| Metal salt of unsaturated carboxylic acid | Zinc acrylate | 25.5 | 22.8 | 26.9 | 24.9 | 22.9 | 28.9 |
| Organic sulfur compound | Zinc salt of pentachloro-thiophenol | 1.0 | 1.0 | 1.0 | 1.0 | 1.0 | 1.0 |
| Inorganic filler | Zinc oxide | 21.7 | 22.8 | 21.1 | 21.9 | 22.7 | 20.2 |
| Antioxidant | NOCRAC NS-6 | 0.1 | 0.1 | 0.1 | 0.1 | 0.1 | 0.1 |

Note to Table 1
HCBN-13: A product from JSR Corporation. Containing 96% of cis-1,4 linkage. Having a Mooney viscosity ($ML_{1+4}$(100° C.)) of 53 and a molecular weight distribution (Mw/Mn) of 3.2. Produced by using an Nd catalyst.
BR01: A product from JSR Corporation. Containing 96% of cis-1,4 linkage. Having a Mooney viscosity ($ML_{1+4}$(100° C.)) of 44 and a molecular weight distribution (Mw/Mn) of 4.2. Produced by using an Ni catalyst. Having a solution viscosity of 150 mPa · s.
BR11: A product from JSR Corporation. Containing 96% of cis-1,4 linkage. Having a Mooney viscosity ($ML_{1+4}$(100° C.)) of 44 and a molecular weight distribution (Mw/Mn) of 4.1. Produced by using an Ni catalyst. Having a solution viscosity of 270 mPa · s.
Perhexa 3M-40: A product from NOF CORPORATION. A 40% diluted version. The amount added is expressed in terms of the net weight of 1,1-bis(t-butylperoxy)-3,3,5-trimethyl-cyclohexane.
Percumyl D: A product from NOF CORPORATION. Dicumyl peroxide.
Zinc acrylate: A product from NIHON JYORYU KOGYO CO., LTD.
Zinc salt of pentachlorothiophenol: A product from Tokyo Kasei Kogyo Co., Ltd.
Zinc oxide: A product from SAKAI CHMICAL INDUSTRY CO., LTD.
NOCRAC NS-6: A product from OUCHISHINKO CHEMICAL INDUSTRIAL Co., LTD. 2,2'-methylenebis(4-methyl-6-t-butylphenol).

TABLE 2

| Component (parts by weight) | Example | | | Comparative Example | | |
|---|---|---|---|---|---|---|
| | 1 | 2 | 3 | 1 | 2 | 3 |
| Himilan 1605 | 40 | 45 | 35 | | | |
| Himilan 1706 | 40 | 45 | 35 | | | |
| HSB 1561 | 20 | 10 | 30 | | | |
| Himilan 1557 | | | | | 52 | |
| Himilan 1601 | | | | | 48 | |
| Surlyn 7930 | | | | 60 | | 47 |
| Surlyn 6320 | | | | 35 | | 40 |
| Nucrel 9-1 | | | | 5 | | 13 |
| Titanium dioxide | 2 | 2 | 2 | 2 | 2 | 2 |

Note to Table 2
Himilan 1605: A product from Du pont-Mitsui Polychemicals Co., ltd. Ethylene-methacrylic acid copolymer neutralized with Na ions.
Himilan 1706: A product from Du pont-Mitsui Polychemicals Co., ltd. Ethylene-methacrylic acid copolymer neutralized with Zn ions.
HSB 1561: A product from JSR Corporation. A block copolymer having an amino group at the terminal. A hydrogenated triblock copolymer, with its styrene block terminal modified with an amino group. Cs-EB-Co type.
Himilan 1557: A product from DuPont-Mitsui Polychemicals Co., Ltd. Ethylene-methacrylic acid copolymer neutralized with Zn ions.
Himilan 1601: A product from Du pont-Mitsui Polychemicals Co., ltd. Ethylene-methacrylic acid copolymer neutralized with Na ions.
Surlyn 7930: A product from DuPont in the U.S. Ionomer resin.
Surlyn 6320: A product from DuPont in the U.S. Ionomer resin.
Nucrel 9-1: A product from DuPont in the U.S. Ternary acid copolymer.

TABLE 3

| Type of dimple | | A | B | C |
|---|---|---|---|---|
| Total number | | 432 | 398 | 432 |
| VR (%) | | 0.81 | 0.92 | 1.03 |
| SR (%) | | 78.6 | 74.5 | 78.6 |
| Number of dimple types | | 3 | 4 | 3 |
| Dimple type 1 | Diameter (mm) | 3.9 | 4.1 | 3.9 |
| | Depth (mm) | 0.16 | 0.19 | 0.2 |
| | Number | 300 | 48 | 300 |
| Dimple type 2 | Diameter (mm) | 3.4 | 3.8 | 3.4 |
| | Depth (mm) | 0.13 | 0.18 | 0.17 |
| | Number | 60 | 254 | 60 |
| Dimple type 3 | Diameter (mm) | 2.6 | 3.2 | 2.6 |
| | Depth (mm) | 0.10 | 0.16 | 0.14 |
| | Number | 72 | 72 | 72 |
| Dimple type 4 | Diameter (mm) | | 2.4 | |
| | Depth (mm) | | 0.12 | |
| | Number | | 24 | |

Note to Table 3
VR (%)
The ratio (%) of the sum total of the volumes of individual dimples under the plane surrounded by the periphery of each dimple to the volume of a virtual sphere without dimples in the surface thereof.
SR (%)
The ratio (%) of the sum total of the areas surrounded by the periphery of individual dimples to the surface area of a virtual sphere, assuming that the golf ball is a virtual sphere without dimples.

TABLE 4

| Physical properties | | Example | | | Comparative Example | | |
|---|---|---|---|---|---|---|---|
| | | 1 | 2 | 3 | 1 | 2 | 3 |
| Core | Outside diameter (mm) | 38.9 | 38.9 | 38.9 | 38.9 | 38.9 | 38.9 |
| | Hardness (mm) | 4.0 | 4.4 | 3.8 | 4.0 | 4.4 | 3.2 |
| Cover | Thickness (mm) | 1.9 | 1.9 | 1.9 | 1.9 | 1.9 | 1.9 |
| | Hardness | 57 | 60 | 53 | 57 | 60 | 53 |

TABLE 4-continued

| Physical properties | | Example 1 | Example 2 | Example 3 | Comparative Example 1 | Comparative Example 2 | Comparative Example 3 |
|---|---|---|---|---|---|---|---|
| Type of dimples | | A | A | B | A | C | A |
| Ball | Outside diameter (mm) | 42.7 | 42.7 | 42.7 | 42.7 | 42.7 | 42.7 |
| | Weight (g) | 45.3 | 45.3 | 45.3 | 45.3 | 45.3 | 45.3 |
| | Hardness (mm) | 3.6 | 3.7 | 3.6 | 3.6 | 3.7 | 2.9 |
| Flying performance | Initial velocity (m/s) | 58.4 | 58.3 | 58.4 | 57.8 | 57.7 | 58.2 |
| | Spin (rpm) | 2740 | 2630 | 2780 | 2730 | 2660 | 3040 |
| | Carry (m) | 183.0 | 182.5 | 183.5 | 179.5 | 176.0 | 182.0 |
| | Total (m) | 209.5 | 210.0 | 208.5 | 205.5 | 202.5 | 205.0 |
| Shot feeling | Driver | ○ | ○ | ○ | ○ | ○ | × |
| | Putter | ○ | ○ | ○ | ○ | ○ | Δ |
| Scuff resistance | | ○ | ○ | ○ | ○ | ○ | × |

Note to Table 4
Core diameter (mm)
An average of five measurements on the surface.
Core hardness (mm)
An amount of deformation (mm) under a load of 980 N (100 kgf).
Cover thickness (mm)
Calculated from (Outside diameter of ball − Outside diameter of core) ÷ 2
Cover hardness
Shore D hardness measured according to ASTM D-2240.
Ball outside diameter (mm)
An average of five measurements on the surface without dimples.
Ball hardness (mm)
An amount of deformation under a load of 980 N (100 kgf).
Flying performance
Measured by using a shot machine (from Miyamae Co., Ltd.). Sample balls were hit with a driver (W#1) at a head speed of 40 m/s to measure the initial velocity, spin, carry, and total flying distance.
Shot feeling
Rated by a majority of five advanced amateur golfers who hit sample balls with a driver (W#1) and a putter.
○ : soft
Δ: normal
×: hard
Scuff resistance
Rated according to the following criterion by visually observing damages made on the ball which was hit (after keeping at 23° C.) at a head speed of 33 m/s by a swing robot machine provided with a pitching wedge.
○ : no damage or almost unnoticeable damage
×: severe damage with surface fluffing or dimple cracking The present invention is not limited to the detailes of the above dscribed preferred embodiments. The scope of the invention is defined by the appended claims and all changes and modifications as fall within the equivalence of the scope of the claims are therefore to be embraced by the invention.

Japanese Patent Application No. 2002-349036 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A two-piece solid golf ball made up of a solid core and a cover wherein said, solid core is formed from a rubber composition composed of (A) 100 parts by weight of rubber base material containing 60 to 100% by weight of a polybutadiene which is synthesized with a catalyst of rare earth element and contains no less than 60% of cis-1,4-linkage, (B) 0.1 to 0.8 parts by weight of organic peroxide, (C) an unsaturated carboxylic acid and/or a metal salt thereof, (D) an organic sulfur compound, and (E) an inorganic filler and said solid core deforms by 3.0 to 5.5 mm under a load of 980 N (100 kgf) and has a diameter of 37 to 42 mm, and said cover is formed mainly from a mixture of (M) a block copolymer having amino groups at its terminals and (N) an ionomer resin, with the ratio of (M)/(N) being from 3/97 to 60/40 (by weight) and has a thickness of 0.5 to 2.5 mm and a Shore D hardness of 50 to 70, and that said two-piece solid golf ball made up of a solid core and a cover deforms by 3.0 to 5.0 mm under a load of 980 N (100 kgf).

2. The two-piece solid golf ball of claim 1, wherein the polybutadiene is a modified polybutadiene obtained by synthesis with an Nd-based catalyst as the catalyst of rare earth element and subsequent reaction with a terminal modifier.

3. The two-piece solid golf ball of claim 1, wherein the rubber composition is one which is composed of (A) 100 parts by weight of rubber base material containing no less than 60% of cis-1,4-linkage and also containing 60 to 100% by weight of polybutadiene synthesized by using a catalyst of rare earth element, (B) more than one kind of organic peroxide compound, (C) 10 to 60 parts by weight of an unsaturated carboxylic acid and/or a metal salt thereof, (D) 0.1 to 5 parts by weight of an organic sulfur compound, and (E) 5 to 80 parts by weight of an inorganic filler.

4. The two-piece solid golf ball of claim 1, wherein the cover has a large number of dimples in the surface thereof such that the dimple volume ratio (VR) is 0.70 to 1.00% and the dimple surface area ratio (SR) is 70 to 85%, with VR being defined as the ratio of the sum total of the volumes of individual dimples under the plane surrounded by the periphery of each dimple to the volume of a virtual sphere without dimples in the cover, and SR being defined as the ratio of the sum total of the areas surrounded by the periphery of individual dimples to the surface area of the virtual sphere.

* * * * *